Nov. 9, 1943.  E. H. BRANSON  2,333,980

SLIP FRICTION CLUTCH

Filed March 26, 1941

INVENTOR
E. H. Branson,
BY  Neil D. Preston,
HIS ATTORNEY.

Patented Nov. 9, 1943

2,333,980

UNITED STATES PATENT OFFICE 2,333,980

SLIP FRICTION CLUTCH

Edward H. Branson, Rochester, N. Y., assignor to General Railway Signal Company, Rochester, N. Y.

Application March 26, 1941, Serial No. 385,224

2 Claims. (Cl. 64—30)

This invention relates in general to slip friction clutches and has more particular reference to an improved clutch which protects against failure to slip, as intended, when the load connected to the clutch becomes excessive.

The clutch of this invention can be used in any suitable connection, but it is particularly adapted for use in connection with the operation of a railway track switch by a usual power operated switch machine.

More specifically, the clutch of this invention includes a plurality of driven plates or discs, and of driving plates or discs, so arranged that slippage occurs whenever the clutch is employed, provided the direction of movement of each operation is the opposite of that of the immediately preceding operation, even though the load is not excessively large, whereby to assure that the plates shall not stick together or freeze, and cause failure of the protective feature of the slip clutch when an emergency arises.

Further objects, purposes and characteristic features of this invention will appear as the description progresses, reference being made to the accompanying drawing showing solely by way of example, and in no manner whatsoever in a limiting sense, one form which the invention can assume.

In the drawing—

Figure 1:
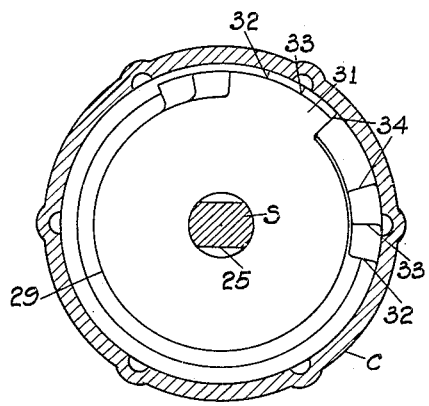
Fig. 1 is a sectional view, on line 1—1 of Fig. 2, viewed in the direction of the arrows.

Referring now to the drawing, a clutch, constructed in accordance with this invention, includes a cup-shaped casing C which is open at one end, and is normally closed by a top member T. The top member is fastened to the casing by means of bolts 6 and washers 7, with the bolts fastening the top to an inwardly projecting casing flange 8, which can be integral with the cup member C. The parts can be readily assembled in properly matching position by means of pins 9 received in matching openings in the two members C and T.

Carried by top member T is a bevel gear 10 which can be connected in any desired way to the device to be moved, and this gear and the interconnected casing and top member then constitute the driven member when considered with reference to the clutch as a unit. The gear 10 can, of course, be employed as the driving member, if desired, and be connected to a motor, or the like.

Carried by top member T in a central threaded opening 11 is a threaded nut 12 which can be screwed in or out of the top member from the position shown, whereby to vary the effort exerted by a helical spring 13, received at one end in an opening 14 provided therefor in the nut, for a purpose to be described below.

Received in an opening in the nut is a driving shaft S constituting the driving member which projects into the cup member and is received at the inner end in an oilless bearing bushing 15, there being a shoulder 16 on the shaft to limit the axial movement of the shaft so as to space the end 17 of the shaft from the inner face of a receiving socket 18. This shaft S becomes, of course, the driven member if the gear be considered the driving member and then is connected to the load as a power operated track switch, or the like.

Shaft S on its outer end 19 which projects beyond the outer face of nut 12 carries a driving pinion 20, slidable on the shaft but fastened to the shaft for driving the shaft by means of a key 21 received in the shaft as shown at 22, and projecting into a keyway 23 in pinion 20. A thrust washer 24 is carried by pinion 20 and is held thereon as by a pressed fit.

Figure 6:
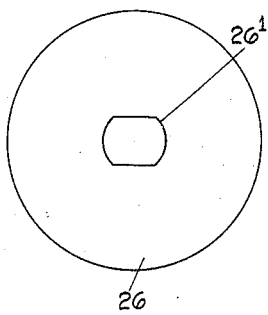
Figure 7:
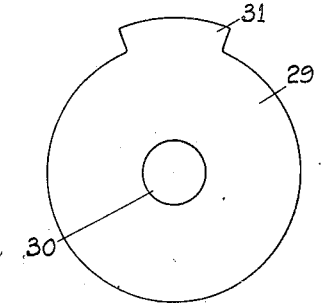

The shaft S, intermediate its ends, is formed with opposed flat faces 25, as shown in Fig. 1. Carried on this shaft and within the casing and top member is a number of discs for forming the friction connection between the driving shaft S and the driven gear 10. While these discs may vary in number in accordance with conditions and service desired, in the embodiment of the invention here shown, there are three discs or driving elements 26 formed of suitable metal, such as steel, and received on the flatted portion of the shaft by means of matching flat sided central openings 26¹, Fig. 6, whereby to be slidable on the shaft, but to be constrained to rotation with the shaft. At each side of each disc 26 is a disc 27 formed of suitable friction material such as molded brake material of asbestos or the like, similar to molded brake linings as used in automobiles, for example. These discs 27 are received on shaft S by means of circular central openings 28 whereby the discs are not only slidable but also rotatable relatively to the shaft.

Figure 2:
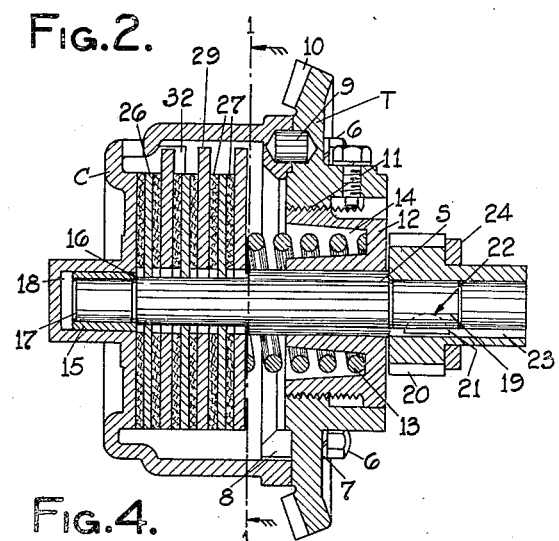
Fig. 2 is a central longitudinal sectional view of the clutch, with parts shown in elevation.
Figure 3:
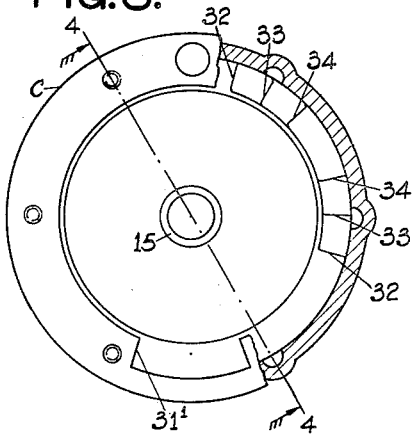
Fig. 3 is a top plan view, with parts removed, and with portions broken away.

Also received on shaft S are three driven members or discs 29 having shaft receiving circular openings 30, whereby to be both rotatable and slidable on the shaft and each carries an outwardly projecting drive lug 31 for cooperating with lugs on the casing member C. These discs 29 are positioned as shown in Fig. 2 whereby the outer face of the top one furnishes a bearing face for the inner end of spring 13 while the other two discs 29 are positioned respectively between two adjacent friction discs 27. The flange 8 of casing member C is cut away as shown at 31¹ whereby to allow the passage of the lugs 31 of discs 29 past the flange during assembly.

Figure 4:
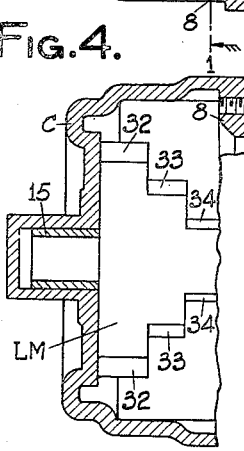
Fig. 4 is a sectional view, on line 4—4 of Fig. 3, viewed in the direction of the arrows.
Figure 5:
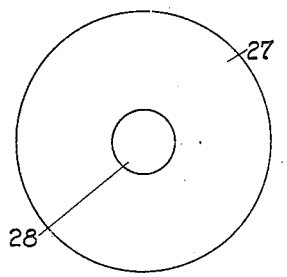
Figs. 5, 6 and 7 are plan views of different kinds of clutch discs employed in the clutch of this invention.

The casing member C is formed with an inwardly projecting stepped lug member LM as shown, for example, in Fig. 4, for cooperation with the lugs 31 on the driven discs 29. This lug member has three pairs of bearing steps or faces 32, 33 and 34. As shown, the faces 32 are spaced from each other a greater distance than are the faces 33, and likewise the faces 33 are spaced further from each other than are the faces 34. These faces project inwardly for cooperation with the lugs 31 whereby, if the discs 29 are rotated with shaft S the lugs on these discs will strike against the corresponding bearing faces and tend to drive the driven gear 10. The inner bottom face of the member C is flat to furnish a bearing surface for the friction disc 27 which is adjacent thereto. The spring 13 presses the various discs together against the bottom of member C and thus produces friction between the various discs when an attempt is made to move the adjacent discs with respect to each other.

For example, if shaft S is turned, driving discs 26 constrained to turn with the shaft, turn, and due to the friction between these discs 26 and the friction discs 27, and between the friction discs 27 and the driven discs 29, the discs all move as a unit with the shaft except possibly the lowermost friction disc 27. This disc may move relatively to the casing or it may move relatively to its adjacent disc 26. In either event, a driving effort is transmitted to the driven gear, to the amount necessary to cause this referred to relative movement.

Assume now, as ordinarily is the case, that the load to be driven is greater than the driving effort transmitted, as described above, the rest of the discs move as a unit with the shaft until such time as the lug 31 (assuming the lugs 31 to all be in line or arranged in the positions resulting from the immediate previous operation which was in the opposite direction) of the lowermost driving disc 29 contacts with the adjacent face 32 which is, as shown, positioned at a level to contact the lug of this particular disc 29. If the load is sufficiently great, this disc 29 will slip with respect to the adjacent friction discs until the next or intermediate driving disc 29 brings its lug in contact with the adjacent face 33 of the lug member on the casing. If the frictionally transmitted drive torque is, at this point, insufficient to drive the load, this intermediate driving disc will slip with respect to its adjacent friction discs until the lug 31 on the top driving disc 29 bears against its adjacent face 34 on the lug member LM. The transmitted drive torque will under these conditions normally be sufficient to carry the load and accordingly, the shaft S and the gear 10 will move together as a unit as though the drive were through a rigid connection.

The compression of spring 13 is preferably so adjusted that the load to be driven is greater than the transmitted drive torque after two of the driving discs have contacted with their corresponding faces on the lug member but is less than the transmitted drive torque when the third driving disc has contacted its lug with its corresponding face on the lug member.

From the above it can be readily seen that, upon each of a series of alternating direction operations involving the clutch, all of the driven discs will slip with respect to the adjacent braking discs, except the last, before the load is driven. In the usual friction clutch, whether only two discs or a plurality of discs be employed, there is no slipping under the normal conditions of load. This condition may persist over a long period of time, and the relatively movable discs which are held together merely by friction may tend to freeze or bind, so that a greater than safe driving torque is transmitted by the friction clutch. Under such conditions, if the load be increased beyond its normal value, as, for example, in the case of the operation of a track switch, by a piece of coal operating to prevent the switch from being fully thrown, damage might readily occur to the various connections or to the driving motor, etc. With the load too large to be handled, and the motor unable to move to its final position where its energy is automatically cut off, mechanical and electrical damage may easily occur, were it not for the clutch.

With the clutch of the kind described above, however, upon each operation, the relatively movable discs slip with respect to each other and even though a long time elapses before a prohibitively large load be encountered, there is no danger of the discs in the clutch freezing or binding and opening the way for possible damage.

The above rather specific description of one form of the present invention is given solely by way of example and is not intended in any manner whatsoever in a limiting sense. It is to be understood that various modifications, adaptations and alterations may be applied to meet the requirements of practice without in any manner departing from the spirit or scope of the invention except as limited by the appended claims.

Having described my invention, I now claim:

1. In a slip friction clutch, in combination, a cup-like casing, a shaft rotatable in the casing, a plurality of driving discs in the casing and slidably, but non-rotatably, carried on the shaft, a plurality of driven discs in the casing and interspaced alternately with the driving discs and both slidably and rotatably carried on the shaft, a disc of friction material slidably and rotatably carried on the shaft between each pair of adjacent faces of the other discs so as to hold said other discs out of physical contact with each other at all times, elastic means pressing all of the discs together, an outward projection on each driven disc, and inwardly projecting means on the inner face of the casing extending into the paths of movement of the projections on the driven discs and positioned to successively engage the driven disc projections as the shaft is turned in either direction whereby to constitute a clutch depending for its driving effect solely on friction.

2. In a slip friction clutch, in combination, a cup-like casing, a shaft rotatable in the casing, a plurality of driving discs in the casing and slidably, but non-rotatably, carried on the shaft, a plurality of driven discs in the casing and interspaced alternately with the driving discs and both slidably and rotatably carried on the shaft, a disc of friction material slidably and rotatably carried on the shaft between each pair of adjacent faces of the other discs and spacing said other discs, at all times, out of positive driving relation to one another, elastic means pressing the discs together, an outward projection on each driven disc, and inwardly projecting means on the inner face of the casing extending into the paths of movement of the projections on the driven discs and positioned to successively engage the driven disc projections when the projections are all initially axially aligned as the shaft is turned.

EDWARD H. BRANSON.